March 18, 1947.  M. THOMSON  2,417,575
WINDSHIELD CLEANER
Filed June 19, 1943
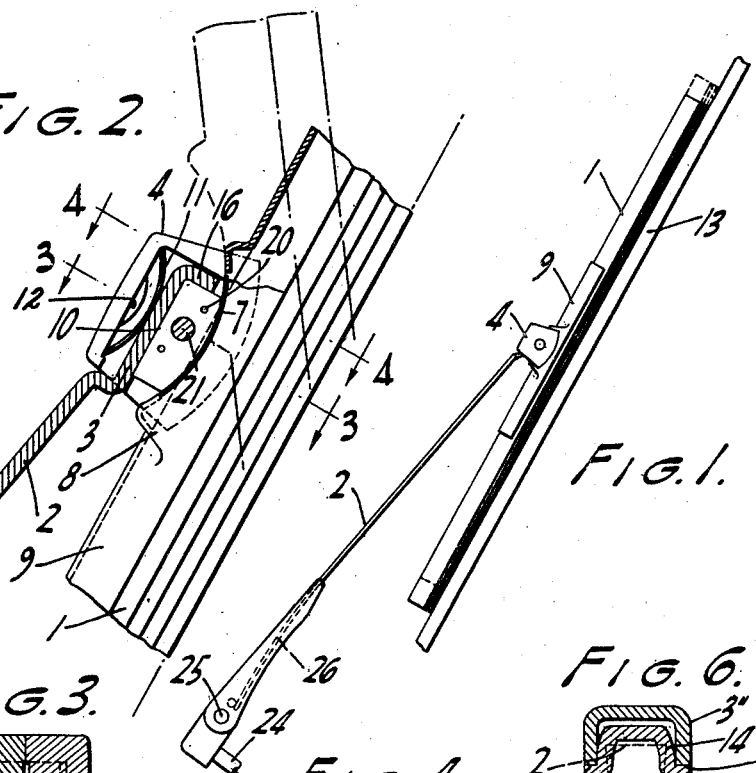
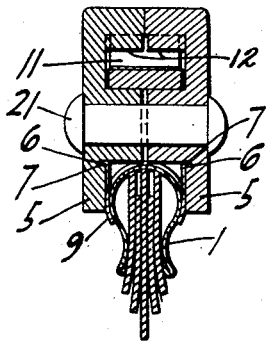
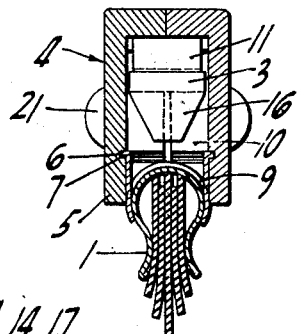
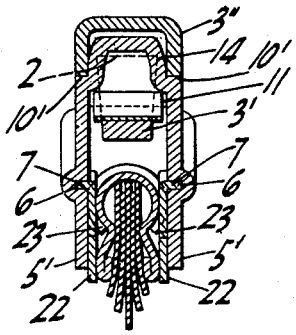
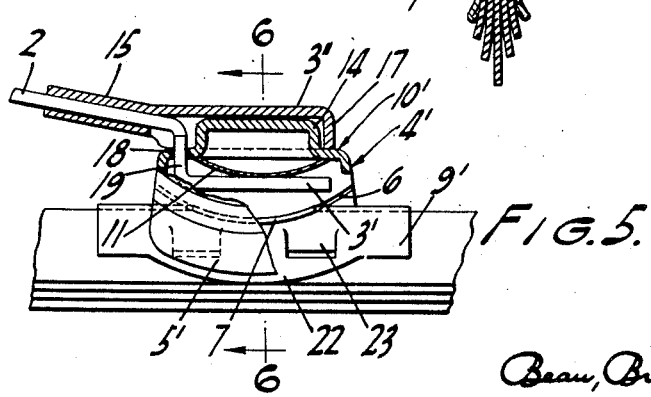
INVENTOR
MARSHALL THOMSON
BY
Bean, Brooks, Buckley & Bean
ATTORNEYS Patented Mar. 18, 1947

2,417,575

UNITED STATES PATENT OFFICE 2,417,575

WINDSHIELD CLEANER

Marshall Thomson, Williamsville, N. Y., assignor to Trico Products Corporation, Buffalo, N. Y.

Application June 19, 1943, Serial No. 491,491

12 Claims. (Cl. 15—250)

This invention relates to a windshield cleaner and primarily to an improvement in the manner of attaching the wiper to its actuating arm. More particularly the invention relates to an arm-wiper connector embodying means for normalizing or uprighting the wiper blade on the windshield surface when at rest to thereby avoid the premature impairment of the rubber squeegee through a permanently set deformation. In the prior art the normalizing means constituted a part of the wiper and its mode of attachment to the wiper arm is such that the functioning of the normalizing feature was frequently defeated and consequently the wiping action of the windshield cleaner was found deficient.

The object of the present invention is to provide a windshield cleaner which is practical and efficient both in wiping the windshield surface as well as in erecting the wiper when at rest.

The invention further has for its object to provide a wiper carrying arm with a rocker head embodying means for restoring the head to a normal position while permitting it to rock during wiper operation so as to impart the desired inclination in the wiper as it is dragged by the arm across the windshield surface.

Further the invention resides in a novel construction by which the wiper is attached to its actuating arm in a firm but practical manner.

Furthermore the invention resides in a membered connector between the arm and its wiper in which the parts are housed and protected from the weather for greater efficiency in operation.

Fig. 1 is a side elevation of a portion of a windshield cleaner as applied to a windshield;

Fig. 2 is an enlarged fragmentary view partly in section disclosing more clearly the present invention;

Figs. 3 and 4 are transverse sectional views about on line 3—3 and 4—4, respectively, of Fig. 2;

Fig. 5 is a view similar to Fig. 2 but showing a modified form of the invention; and Fig. 6 is a transverse sectional view about on line 6—6 of Fig. 5.

Referring more particularly to the drawing, the numeral 1 designates a wiper or cleaning blade and 2 its carrying arm, the latter having a deflected bearing terminal portion 3 lying substantially parallel to the wiper. Mounted on the terminal portion is a laterally rockable head or housing 4 of hollow formation and having depending, wiper straddling side flanges 5. The opposing inner faces of these flanges are formed with arcuate grooves 6 providing seats for like shaped ribs 7 on the wiper. This mounting provides interlocking shoulders on the arm head as well as on the wiper for a rigid connection. The ribs may be formed on parallel side portions 8 of a spring mounting clip 9 which is sprung over the back of the wiper body for frictionally gripping the same whereby the wiper may be adjusted therealong to any desired location for wiping, as illustrated by the dotted lines in Fig. 1. The arcuate grooves or seats are preferably open at their ends to enable placement and replacement of the wiper in the arm carried housing 4, and while the ribs are shown as being carried by the wiper, a reverse arrangement may be resorted to with the ribs on the housing.

Within the chamber of the rockable head is a flat shoulder or normalizing face 10 on which the flat terminal portion 3 fully engages under the urge of a bowed flat spring 11 which is interposed between the top wall of the housing and the terminal portion, an embossment 12 on the top wall serving to limit the flexing of the spring and therethrough to determine the extent of rocking movement of the head on the arm. The action of the spring 11, in cooperation with the flat faces 3 and 10, is to normalize or aright the wiper on the windshield surface 13.

In the modification of Figs. 5 and 6 the terminal portion of the arm is divided into a lower section 3' and an upper section 3'', the lower section providing support for the bowed flat spring 11, as in the first described embodiment, while the upper section 3'' exerts a normalizing or uprighting influence on the wiper. This upper section is of cap shape fitting over a centering knob 14 pressed upwardly from the top wall of the rockable head or housing 4'. The bottom side edges of the cap 3'' are designed to seat on the lateral shoulders which form the normalizing face 10' of the rockable head for normalizing the wiper on the windshield surface. The cap section 3'' may be formed from sheet metal and is provided with a shank 15 wrapped about or otherwise secured to the body of the wiper arm which latter may be of flat spring strip stock. A downturned extremity 16 on the terminal portion 3 (Fig. 1), or an end wall 17 of the cap section 3'' will serve as a keeper to prevent longitudinal displacement of the wiper from the arm and thereby secure the rockable mounting of the housing on the arm. The lower section 3' is threaded downwardly through an opening 18 into the chamber of the housing 4' and has an offset 19 which disposes the section in proper position for supporting the spring.

The housing may be composed of complemental die cast sections secured in proper relation to one another by the dowel pins 20 and the bolt or permanent fastener 21 as shown in Fig. 1, or the housing may be stamped from sheet stock to form the drawn centering knob 14 and the wiper attaching side flanges 5', the latter having the arcuate grooves 6 to slidably receive the wiper carried ribs 7. The mounting clip 9' is provided with extended sides 22 to give lateral support to the sheet metal flanges 5' of the housing 4', wiper embracing tongues 23 being struck inwardly to frictionally grip the contour of the wiper as depicted in Fig. 6.

In operation, the arm 2 which is oscillated by its driving shaft 24 is urged about its pivotal axis 25 by a spring 26 to provide the wiping pressure on the windshield glass, in a well known manner. As the wiper is dragged back and forth over the windshield 13, it will rock at the beginning of each stroke, the housing 4 pivoting first on one side margin of the terminal portion 3 and then on the opposite margin, or in the form shown in Figs. 5 and 6 the housing 4' rocking first on one margin of the cap section 3'' and then on the opposite margin. The wiper will adjust itself into full wiping contact with the glass by reason of the sliding arcuate interlock, and when the wiper comes to rest, the spring 11 will urge the wiper into its normally upright position wherein both margins of the arm carried part fully seat upon the flat bearing face portions of the housing. This normalizing spring action is in cooperation with the wiping pressure urge of the arm spring 26, the latter acting directly through the normalizing face 10 (10') independently of the spring 11. To replace the wiper it is only necessary to slide the same in the arcuate path of the curved ribs 7 to disengage the interlocking arcuate shoulders on the clip and flanges. For changing the radial location of the wiper, the latter may be slid in its frictionally gripping clip 9 (9') which movement is tangential of the clip displacing movement and therefore is prevented from accidentally disconnecting the wiper from the arm.

While the foregoing description has been given in detail, it is not the intention to thereby restrict the scope of the invention beyond that defined by the appended claims since the inventive principles thereof are capable of assuming other physical embodiments than those hereinbefore described.

I claim:

1. In a windshield cleaner, a wiper, a carrying arm therefor having a terminal portion, a housing enclosing such terminal portion and rockable laterally on the arm, said housing having depending wiper straddling side walls with opposed arcuate seats in their inner faces, a spring within the housing interposed between a wall of the latter and the terminal portion and acting to urge the housing to an upright relationship with the terminal portion, and a clip mounted on the wiper for longitudinal adjustment and having lateral arcuate ribs slidably engaged in the seats of the housing.

2. In a windshield cleaner, a wiper carrying arm having a pair of wiper embracing flanges provided in their inner opposed faces with arcuate shoulders for slidable interlock with like shoulders on a detachable wiper.

3. In a windshield cleaner, a wiper, a carrying arm, having a terminal part, a head having a chamber receiving the terminal part for lateral rocking, the head having a substantially planar normalizing upper face, the terminal part having a substantially planar under face fully engageable with the normalizing face to hold the head in a neutral position, and a spring within the chamber acting yieldably to hold said faces in full engagement, said head having a depending part overlapping a part on the wiper and slidably interlockable therewith by cooperating arcuate shoulders.

4. In a windshield cleaner, a wiper, a carrying arm, having a terminal part, a head having a chamber receiving the terminal part for lateral rocking, the head having a normalizing upper face, the terminal part having an under face fully engageable with and bearing down upon the normalizing face to hold the head in a neutral position, and a spring within the chamber acting yieldably to hold said faces in full engagement, said head having oppositely disposed side faces opposing side faces on the wiper and slidably interlocked therewith by an arcuate rib and groove formation serving to define a definite path of angular adjustment for the wiper.

5. In a windshield cleaner, a wiper, a carrying arm having a terminal part, a head having a normalizing face rockable on the terminal part laterally thereof, the head having a chamber and the arm having a second terminal part received by the head chamber, and a spring within the chamber and acting on the second terminal part to urge the head in a neutral position on the first terminal part, the normalizing face of the head being formed with a part interlocking with the second terminal part to center the latter on the face.

6. In a windshield cleaner, a wiper, a carrying arm, having a terminal part, a head having a chamber with a top wall formed with a boss and an adjacent opening, the terminal part insertible through the wall opening and said arm having an adjacent offsetting shoulder disposed in such opening to dispose the terminal part substantially parallel to the overlying top wall, a bowed spring interposed between the terminal part and the top wall, and a cap member fixed to the arm and engaging over the boss in cooperation with the spring to urge a head carried wiper normal to an associate windshield.

7. A windshield cleaner comprising a wiper, an actuating arm therefor movable back and forth and having a substantially planar underface, a housing carried by the arm and having a substantially planar upperface in full seating contact with the underface but laterally rockable thereon first upon one margin and then upon the opposite margin for inclining the wiper rearwardly at the start of each wiping stroke, said housing having a pair of arcuate shoulders slidably interlockable with like shoulders on the wiper whereby the latter may adjust itself to the plane of the windshield independently of the rockable mounting of the housing on the arm, and means yieldably urging the underface and upperface into such full seating contact for normalizing the wiper with respect to the windshield surface.

8. A windshield cleaner comprising a wiper, an actuating arm therefor movable back and forth and having a substantially planar underface, a housing carried by the arm and having a substantially planar upper face in full seating contact with the underface but laterally rockable thereon first upon one margin and then upon the opposite margin for inclining the wiper rearwardly at the start of each wiping stroke, means detachably securing the housing on the arm against longitudinal displacement, said housing having a pair of arcuate shoulders slidably interlockable with like shoulders on the wiper whereby the latter may adjust itself to the plane of the windshield independently of the rockable mounting of the housing on the arm, and means yieldably urging the underface and upperface into such full seating contact for normalizing the wiper with respect to the windshield surface.

9. A windshield cleaner comprising a wiper blade having a mounting clip frictionally embracing the back portion of the blade for adjustment lengthwise thereof, an actuating arm having a curved clip engaging part, the clip having means slidably interlockable with said part of the actuating arm and adjustable by a movement at an angle to the longitudinal axis of the wiper whereby the adjustment of the blade in the clip may be effected without adjustment of the clip on the arm and adjustment of the clip on the arm effected without altering the adjustment of the clip on the blade.

10. A windshield cleaner comprising a wiper having a spring mounting clip frictionally adjustable lengthwise thereof, the clip having an arcuate part slidably interlockable with a like shaped part on an actuating arm by relative rotary movement, one movement of adjustment resisting the other movement of adjustment whereby one adjustment may be made independently of the other adjustment.

11. A wiper having a mounting part formed with a spring mounting clip frictionally adjustable on the back thereof and along its longitudinal axis, said clip having a transverse bearing fixed with respect to the wiper against lateral movement, a reciprocatory arm having a terminal portion with an underface fully engaging the fixed bearing when the wiper is normal to the surface being wiped and supporting the wiper for the direct transmission of arm pressure thereto as well as for laterally rocking to a rearwardly inclined position at the beginning of each stroke, said terminal portion having a keeper part interlocked with the mounting part during such rocking movement but holding the wiper against displacement longitudinally during longitudinal wiper adjustment on the clip, and a normalizing spring urging the fixed bearing into such full engagement with the underface of the arm.

12. A windshield cleaner comprising a resiliently urged wiper carrying arm, a wiper having a head laterally rockable on the outer end of the arm and being in the form of a housing one face of which constitutes a bearing, the arm having a terminal portion seating on the bearing face under the resilient urge of the arm and acting therethrough to press the wiper against a windshield when associated therewith, said arm also having a part interlocking with and extending into the housing, the bearing face and the terminal portion having spaced margins on which the head alternately fulcrums when rocking, and a bowed flat spring supported by the arm within the housing and reacting upon the latter and also upon said terminal portion to yieldably hold the head upright while permitting such lateral rocking on the face.

MARSHALL THOMSON.

REFERENCES CITED

The following references are of record in the file of this patent:

UNITED STATES PATENTS

| Number | Name | Date |
|---|---|---|
| 2,252,510 | Horton | Aug. 12, 1941 |
| 1,973,366 | Anderson | Sept. 11, 1934 |
| 2,285,618 | Scinta | June 9, 1942 |

FOREIGN PATENTS

| Number | Country | Date |
|---|---|---|
| 524,235 | British | Aug. 1, 1940 |
| 524,234 | British | Aug. 1, 1940 |